(12) United States Patent
Beesley et al.

(10) Patent No.: US 7,278,779 B2
(45) Date of Patent: Oct. 9, 2007

(54) MIXER WITH OPTIONAL FAUCET

(75) Inventors: Brian K. Beesley, Draper, UT (US);
Thomas E. Daniels, Jr., Sandy, UT (US)

(73) Assignee: Back to Basics Products, LLC, Vernon Hills, IL (US)

( * ) Notice: Subject to any disclaimer, the term of this patent is extended or adjusted under 35 U.S.C. 154(b) by 277 days.

(21) Appl. No.: 11/045,014

(22) Filed: Jan. 26, 2005

(65) Prior Publication Data

US 2005/0185507 A1 Aug. 25, 2005

Related U.S. Application Data

(63) Continuation-in-part of application No. 10/278,713, filed on Oct. 23, 2002, now Pat. No. 6,966,689, which is a continuation-in-part of application No. 10/012,239, filed on Nov. 13, 2001, now Pat. No. 6,527,433.

(60) Provisional application No. 60/248,254, filed on Nov. 13, 2000.

(51) Int. Cl.
*A47J 43/06* (2006.01)

(52) U.S. Cl. ........................ 366/205; 366/192

(58) Field of Classification Search .............. 366/189, 366/192, 194, 205, 302, 306, 314, 347, 349, 366/195–196; 99/348; 241/101.8, 282.1, 241/282.2
See application file for complete search history.

(56) References Cited

U.S. PATENT DOCUMENTS

| 373,113 A | 11/1887 | Wagner |
|---|---|---|
| 374,706 A | 12/1887 | Rosenkranz |
| 1,412,536 A | 4/1922 | Mayer |
| 1,874,079 A * | 8/1932 | Black .................... 241/97 |
| 2,012,637 A | 8/1935 | Ribley |
| 2,066,997 A | 1/1937 | Mueller |
| 2,070,545 A | 2/1937 | Gilbert |
| 2,282,866 A | 5/1942 | Hagen |
| 2,311,379 A | 3/1943 | Gillanders |
| 2,315,018 A * | 3/1943 | Lawrence ............... 99/501 |
| D156,635 S | 12/1949 | Law et al. |
| 2,559,196 A | 7/1951 | Medved |
| 2,785,547 A | 5/1957 | Barros |
| D183,177 S | 7/1958 | Oertli |
| 2,851,258 A | 9/1958 | Siehrs |
| 2,945,634 A | 7/1960 | Beck et al. |
| D189,904 S | 3/1961 | Seltsam |
| 3,013,775 A | 12/1961 | Bruntjen |
| D194,389 S | 1/1963 | Bejamin |
| 3,088,345 A | 5/1963 | Campbell |
| 3,104,089 A | 9/1963 | Seltsam |
| 3,107,711 A | 10/1963 | Azmus |

(Continued)

FOREIGN PATENT DOCUMENTS

GB 764361 A 12/1956

(Continued)

*Primary Examiner*—Charles E. Cooley
(74) *Attorney, Agent, or Firm*—Thorpe North & Western (57) ABSTRACT

A food mixer device and method includes a container configured to receive food. A pair of interchangeable container bases are each separately and removably couplable to the container. At least one mixing assembly is rotatably disposed in the container. A faucet is operatively coupled to one of the interchangeable container bases.

23 Claims, 7 Drawing Sheets

U.S. PATENT DOCUMENTS

| | | |
|---|---|---|
| D200,230 S | 2/1965 | Seltsam |
| D205,827 S | 9/1966 | Plagenberg |
| 3,315,947 A | 4/1967 | Nauta |
| 3,346,029 A | 10/1967 | Harris |
| 3,355,068 A | 11/1967 | Harland |
| 3,417,972 A * | 12/1968 | Conway ............... 241/199.12 |
| 3,427,636 A | 2/1969 | Seifert |
| 3,765,275 A | 10/1973 | Johnson |
| 3,780,393 A | 12/1973 | Gaetke |
| 3,895,548 A | 7/1975 | Sauve |
| 3,920,224 A | 11/1975 | Fassauer |
| 3,938,784 A | 2/1976 | Moreton |
| 3,951,351 A * | 4/1976 | Ernster et al. ........... 241/101.1 |
| 4,030,707 A | 6/1977 | Moreton |
| 4,071,789 A * | 1/1978 | Ernster et al. ................ 310/50 |
| D249,701 S | 9/1978 | Maples et al. |
| 4,116,366 A | 9/1978 | Takenakashima et al. |
| 4,137,578 A | 2/1979 | Felici |
| 4,201,487 A | 5/1980 | Backhaus |
| 4,250,771 A | 2/1981 | Berler |
| 4,252,160 A | 2/1981 | Numbers |
| 4,268,080 A | 5/1981 | Lindley |
| 4,337,000 A | 6/1982 | Lehmann |
| 4,357,861 A | 11/1982 | Di Girolamo |
| D267,841 S | 2/1983 | Leslie |
| D268,841 S | 5/1983 | Adams |
| D269,471 S | 6/1983 | Auerbach |
| 4,395,792 A | 8/1983 | Cosner |
| 4,397,427 A | 8/1983 | Howard |
| D271,368 S | 11/1983 | Belland et al. |
| 4,488,664 A | 12/1984 | Cleland |
| 4,501,538 A | 2/1985 | Bray et al. |
| 4,513,688 A | 4/1985 | Fassauer |
| 4,537,332 A | 8/1985 | Brown et al. |
| 4,561,782 A | 12/1985 | Jacobsen et al. |
| D295,138 S | 4/1988 | Hyde |
| 4,824,369 A | 4/1989 | Levy |
| 5,048,402 A | 9/1991 | Letournel et al. |
| D337,234 S | 7/1993 | Mcginnis |
| 5,302,021 A | 4/1994 | Jennett et al. |
| 5,323,691 A | 6/1994 | Reese et al. |
| 5,356,215 A | 10/1994 | Inoue et al. |
| D363,634 S | 10/1995 | Cohn |
| 5,479,851 A | 1/1996 | McClean et al. |
| D370,151 S | 5/1996 | McLinden et al. |
| 5,518,312 A | 5/1996 | Inoue et al. |
| D378,400 S | 3/1997 | Kowalics |
| D379,050 S | 5/1997 | Kohanski |
| 5,636,923 A | 6/1997 | Nejat-Bina |
| 5,662,032 A | 9/1997 | Baratta |
| 5,671,664 A | 9/1997 | Jacobson |
| 5,690,021 A | 11/1997 | Grey |
| 5,758,963 A | 6/1998 | Xie et al. |
| 5,823,667 A | 10/1998 | Fukushima et al. |
| 5,857,946 A | 1/1999 | Brown |
| D412,262 S | 7/1999 | Roundtree |
| 6,065,188 A | 5/2000 | Wold et al. |
| 6,065,861 A * | 5/2000 | Chen .......................... 366/144 |
| 6,158,626 A | 12/2000 | Guerra et al. |
| 6,283,625 B2 | 9/2001 | Frankel et al. |
| 6,318,247 B1 | 11/2001 | Di Nunzio et al. |
| D463,194 S | 9/2002 | Busick et al. |
| 6,523,994 B2 | 2/2003 | Lawson |
| 6,527,433 B2 * | 3/2003 | Daniels, Jr. ................. 366/205 |
| D473,421 S | 4/2003 | Daniels, Jr. |
| D474,065 S | 5/2003 | Daniels, Jr. |
| D474,067 S | 5/2003 | Daniels, Jr. |
| D474,643 S | 5/2003 | Daniels, Jr. |
| 6,609,821 B2 | 8/2003 | Wulf et al. |
| D482,235 S | 11/2003 | Yui |
| 6,652,137 B1 | 11/2003 | Bosch et al. |
| D493,331 S | 7/2004 | Munoz |
| 6,817,750 B1 | 11/2004 | Sands |
| 6,966,689 B2 * | 11/2005 | Daniels, Jr. ................. 366/192 |
| 7,213,965 B2 * | 5/2007 | Daniels, Jr. ................. 366/192 |
| 7,217,028 B2 * | 5/2007 | Beesley ...................... 366/205 |
| 2001/0006486 A1 | 7/2001 | Ofveerberg |
| 2002/0027175 A1 | 3/2002 | Capp |
| 2002/0080678 A1 | 6/2002 | Daniel, Jr. |
| 2003/0099154 A1 | 5/2003 | Daniels, Jr. |
| 2005/0185507 A1* | 8/2005 | Beesley et al. ............. 366/205 |
| 2006/0176765 A1* | 8/2006 | Pryor et al. ................. 366/192 |
| 2007/0041268 A1* | 2/2007 | Beesley et al. ............. 366/195 |

FOREIGN PATENT DOCUMENTS

| | | | |
|---|---|---|---|
| JP | 2004-41286 | * | 2/2004 |
| JP | 2004-65325 | * | 3/2004 |
| JP | 2004-113278 | * | 4/2004 |
| JP | 2005073904 A | * | 3/2005 |
| JP | 2005-328946 | * | 12/2005 |
| JP | 2006-102083 | * | 4/2006 |
| WO | 2004/080252 A1 | * | 9/2004 |

\* cited by examiner

Fig. 11 ial description which follows,
MIXER WITH OPTIONAL FAUCET

CROSS-REFERENCE TO RELATED APPLICATIONS AND CLAIM OF PRIORITY

This application is a continuation-in-part U.S. patent application Ser. No. 10/278,713, filed Oct. 23, 2002, now U.S. Pat. No. 6,966,689 which is a continuation-in-part of U.S. patent application Ser. No. 10/012,239, filed Nov. 13, 2001, now U.S. Pat. No. 6,527,433 which claims benefit of U.S. Provisional Application No. 60/248,254, filed Nov. 13, 2000.

BACKGROUND

The present invention relates generally to a mixer, such as a blender. More particularly, the present invention relates to a mixer with interchangeable container bases, one including a faucet.

Blenders have been developed to mix ingredients or food items, such as beverages. For example, ice and fruit and other ingredients can be disposed in the blender and mixed together by rotating blades. It is often difficult to pour the mixed ingredients through the top of the blender due to the viscous nature of the mixture, and the larger size of the blender with respect to the cup or glass.

Smoothie makers have been developed that include a faucet or spout through which the smoothie or mixed ingredients can be dispensed to resist spilling and to facilitate dispensing. In some situations, however, it may be desired to mix ingredients, such as with a smoothie maker, but not necessarily to use the faucet or spout. Using the smoothie maker, however, usually necessitates cleaning the faucet or spout. If it is considered undesirable to clean the faucet or spout, then a blender can be used, thus requiring the user to own both a blender and a smoothie maker.

SUMMARY

It has been recognized that it would be advantageous to develop a mixer that can be used for both blender and smoothie activities, and can selectively provide a faucet when desired, but not require a faucet.

Briefly, and in general terms, the invention is directed to a food mixer device with interchangeable container bases to selectively provide a faucet when desired. The interchangeable container bases can be separately and removably couplable to a container. At least one mixing assembly can be rotatably disposed in the container. A faucet is operatively coupled to one of the interchangeable container bases.

The invention is also directed to a method for mixing food. The method includes deciding whether to dispense the food through a faucet on a container, or pour the food from a top of the container. One of at least two interchangeable container bases is releasably coupled to the container. The two interchangeable container bases include a first container base with a faucet, and a second container base without a faucet. Ingredients are introduced into the container. The ingredients are mixed in the container with a mixing assembly in the container. The food is dispensed through the faucet of the first interchangeable container base, or poured through the top of the container with the second interchangeable container base thereon.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIGS. 1a-c are front views of a food mixer or blender with interchangeable container bases in accordance with an embodiment of the present invention; with FIG. 1b showing a first interchangeable container base with a faucet; FIG. 1a showing a second interchangeable container base without a faucet; and FIG. 1c showing a different third container base and a different container;

FIG. 4 is a perspective view of the second interchangeable container base without a faucet of FIG. 1a;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

As illustrated in FIGS. 1a-c, and 2a and b, a food mixer, blender, smoothie maker, food processor or the like, indicated generally at 10, is shown in an exemplary embodiment for mixing foods and/or drinks, including smoothies, milk shakes, etc. The food mixer 10 advantageously includes interchangeable container bases to selectively provide a faucet to facilitate pouring of the food or drinks, as described in greater detail below. In addition, the food mixer 10 can include a different food processing attachment.

The food mixer 10 can include a container or jar 14 disposable over or associated with a mixer base or housing 18. The container 14 can be removably disposed over the mixer base 18, and thus can be removed from the mixer base 18 for cleaning, etc., while the mixer base can include electrical components, motors, and the like. The mixer base 18 can include a motor 22 (FIGS. 6 and 9) capable of turning a drive mechanism 26 (FIGS. 7-9) that extends from the mixer base 18. In one aspect, the drive mechanism 26 can be located at a top of the mixer base 18, and the container 14 can be disposable over the top of the mixer base 18, and over the drive mechanism 26. Thus, the container 14 can utilize gravity to help maintain the container 14 over the mixer base 18.

A receptacle or socket 30 (FIGS. 7-10) can be formed with the mixer base 18 and configured to receive the container 14, or a portion thereof (such as a container base described below). The receptacle 30 can be formed on the top of the base 18 with the drive mechanism 26 disposed within the receptacle 30. The receptacle 30 can include a perimeter wall 32 to receive the container 14, or portion thereof, therein or thereon. The perimeter wall 32 can be annular, or substantially annular. In one aspect, the receptacle 30 or perimeter wall 32 can include one or more vertical slots 33a and 33b extending into the perimeter wall 32. The container 14 can include a mating plug 34 with one or more mating vertical tabs 35a and 35b. The slots 33a and b can be vertically oriented and positioned in the front and rear to secure the container when the faucet is used. The rear slot 33b can extend to a bottom 36b of the base receptacle to allow any liquid in the receptacle to drain out the rear of the base. The front slot 33a can extend to a position 36a above the bottom of the base receptacle to resist liquid from draining out the front of the base. The tabs 35a and b and the slots 33a and b also align the container on the base, and align the faucet. In another aspect, the receptacle can be shaped or configured to orient the container 14 with respect to the base. For example, the receptacle or perimeter wall can be oblong or oval to restrict the orientation of the container (and faucet) on the base. Alternatively, the shape can be a non-equal triangle, etc.

The container 14 can include a handle 36 to facilitate grasping and manipulating the container. The handle 36 can be positioned or oriented on a lateral side with respect to the mixer base 18 to facilitate being grasped by a user. Thus, the receptacle or perimeter wall can facilitate orienting the handle 36 with respect to the mixer base.

The container 14 can include or be associated with a mixing assembly 38a or 38b that can include one or more blades 42a or 42b rotatably disposed in the container 14, or near a bottom of the container. The mixing assembly 38a or b can be engaged by the drive mechanism 26 of the mixer base 18 when the container 14 is disposed over the mixer base 18, or over the receptacle 30. For example, the drive mechanism 26 and the mixing assembly 38a or b can include mating or matching couplings, such as one or more intermeshing protrusions and indentations, so that the rotation and force of the motor 22 in the base can be transferred to the mixing assembly 38a or b or blades 42a or b in the container 14.

The container 14 can be a hollow shell with an annular wall to receive ingredients therein. In one aspect, the container 14 can include a container portion or shell or wall that can be transparent or translucent, or formed of a transparent or translucent material, to enable viewing the contents of the container 14. The container portion or shell or wall can be glass, and the handle also can be formed of glass. Alternatively, the container can be formed of plastic. A top of the shell or container 14 can be open to receive ingredients therethrough, while the bottom of the shell can be open to receive the mixing assembly 38, or so that the mixing assembly 38 or blades 42 can operatively engage the contents of the container 14. A chute 46 can be formed in the top of the shell or container 14 to facilitate pouring through a top of the container. As stated above and described below, the container 14 can include a container base(s) to close off the bottom of the container 14 and retain the mixing assembly 38a or b. The container base(s) can form a portion of the container, and the mixing assembly can be wholly or partially disposed in the container base(s). The container base(s) can receive the bottom portion of the container or shell to enclose the bottom of the container 14, and can be removable for cleaning.

Figure 1A:
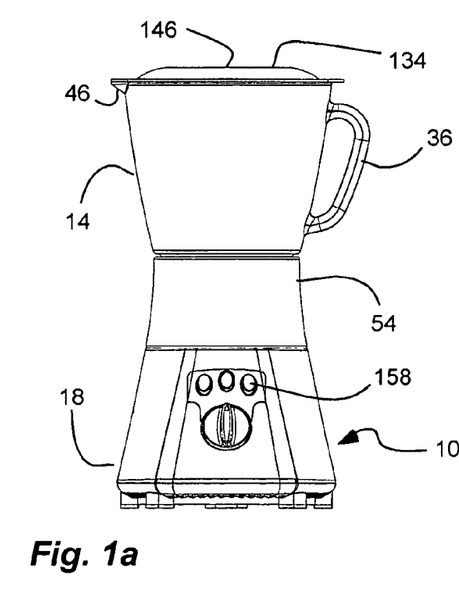
Figure 2A:
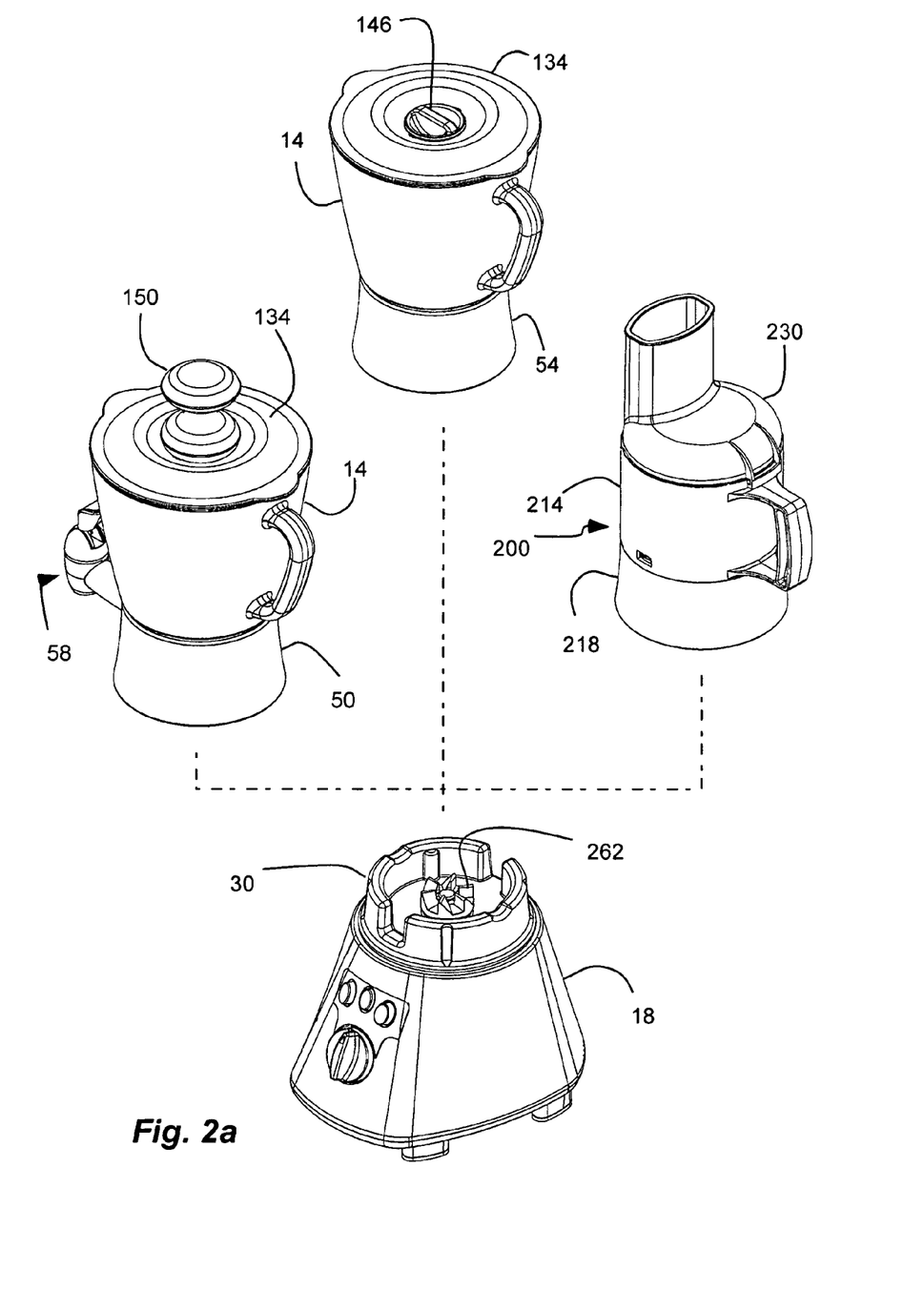
FIG. 2a is a partially exploded perspective view of the food mixer or blender of FIGS. 1a-c showing various possible configurations.
Figure 3:
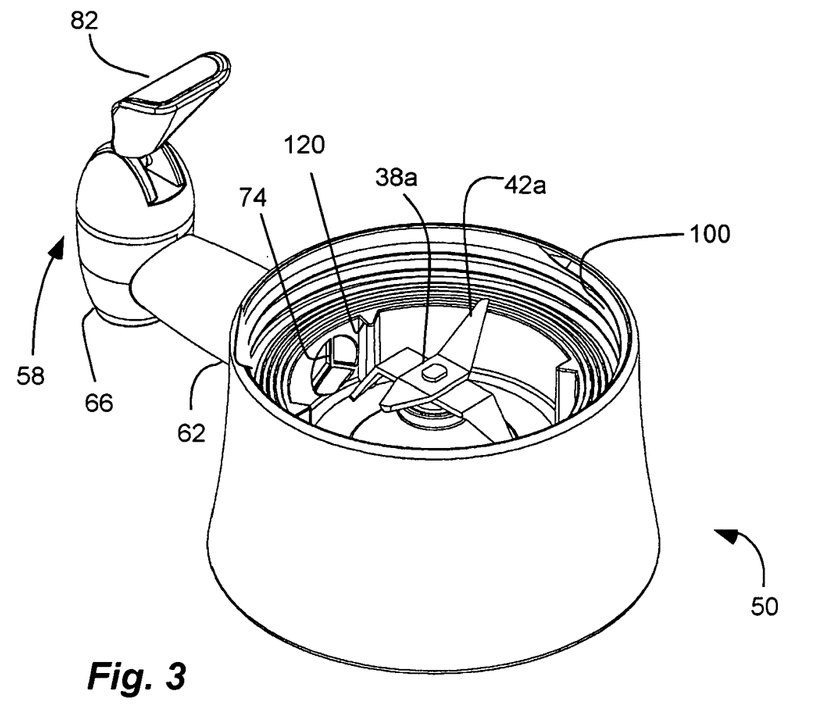
FIG. 3 is a perspective view of the first interchangeable container base with a faucet of FIG. 1b.
Figures 7, 8, 10:
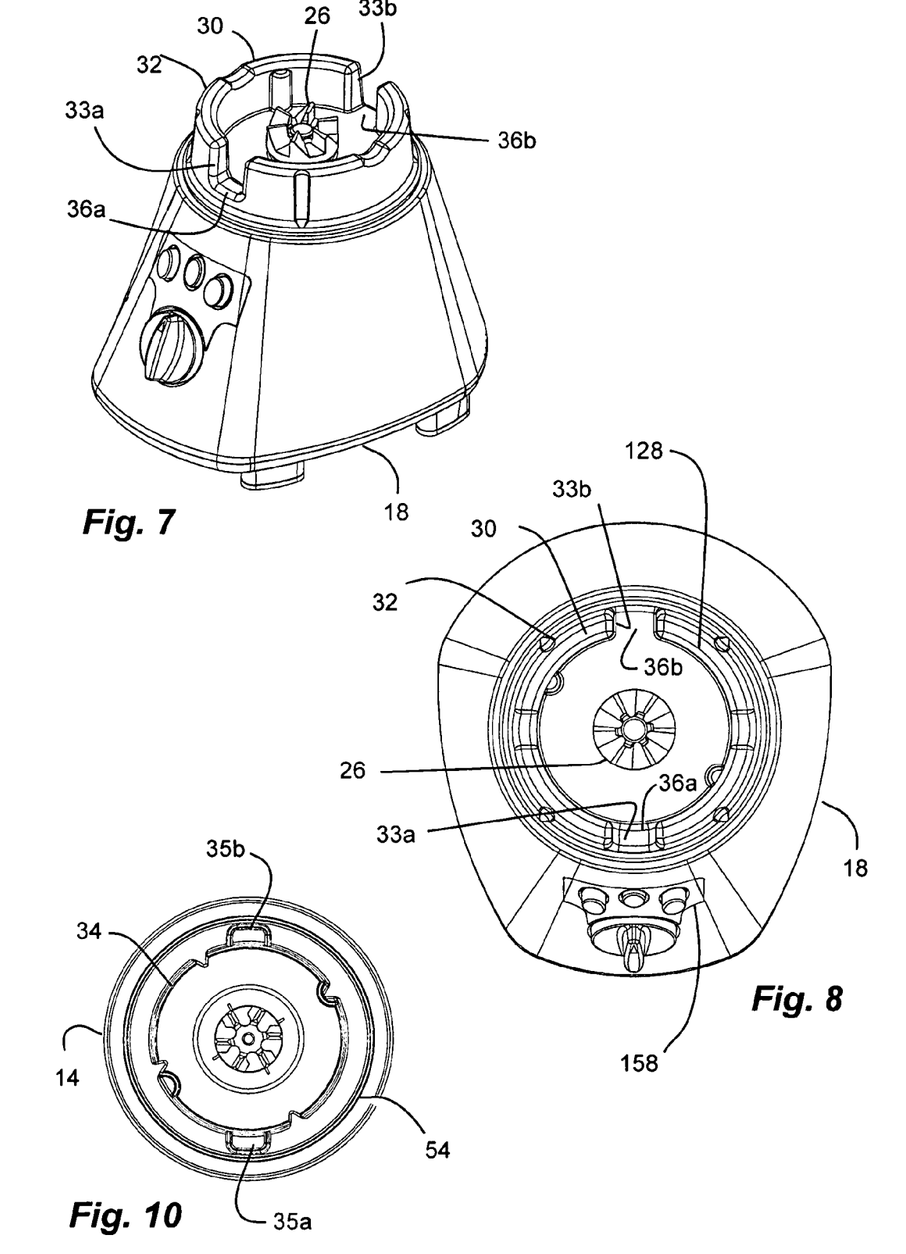
FIG. 8 is a top view of the base of FIG. 7.
FIG. 10 is a bottom view of the container base of FIG. 4.
Figure 11:
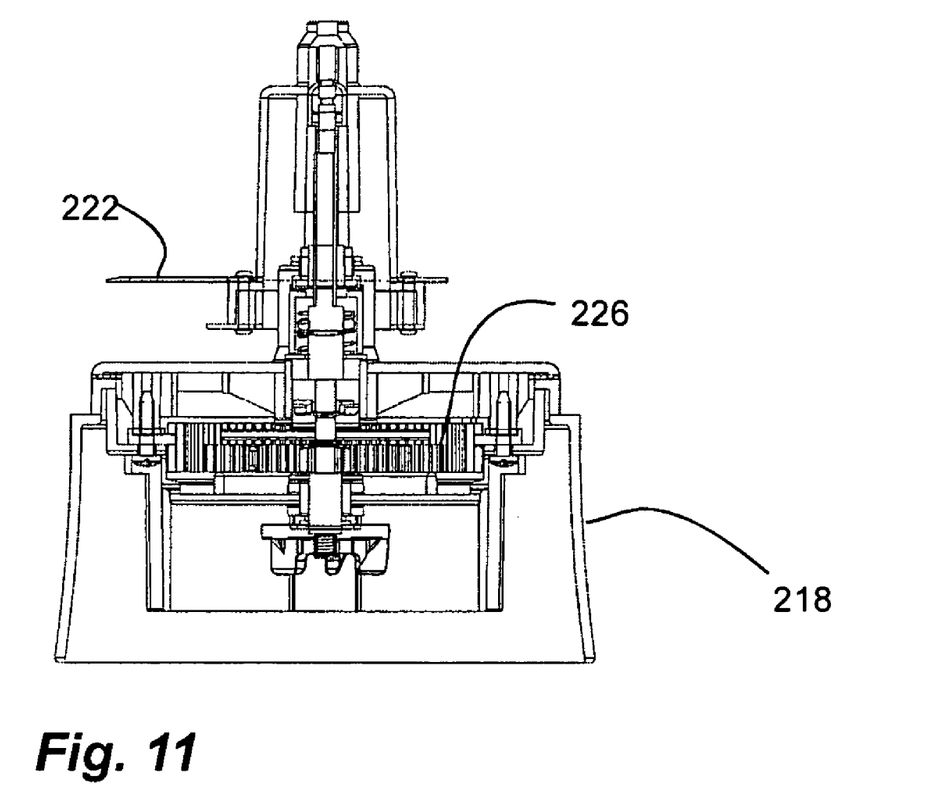
FIG. 11 is a partial, cross-sectional side view of the different third container base of FIG. 1c.

At least two interchangeable container bases can be provided, including a first container base 50 and a second container base 54. The first container base 50 can include a faucet 58 (or spigot or spout) to facilitate dispensing of the contents of the container (FIGS. 1b and 2), while the second container base 54 can be provided without a faucet (FIGS. 1a and 3). The interchangeable container bases 50 and 54 can be separately and removably coupled to the container 14. Referring to FIG. 10, the container bases, represented by container base 54, can include the mating plug 34 with the vertical tabs 35a and 35b.

In addition, the first container base 50 can include a first mixing assembly 38a with first blades 42a, while the second container base 54 can include a second mixing assembly 38b with second blades 42b. The first blades 42a (associated with the first container base 50 and the faucet 58) can be thicker and configured to chop ice. The second blades 42b (associated with the second container base 54) can the thinner, and configured for chopping. For example, the second blades 42b can be serrated. Thus, the interchangeable container bases 50 and 54 can selectively provide a faucet 58, and appropriate blades.

Figure 1B:
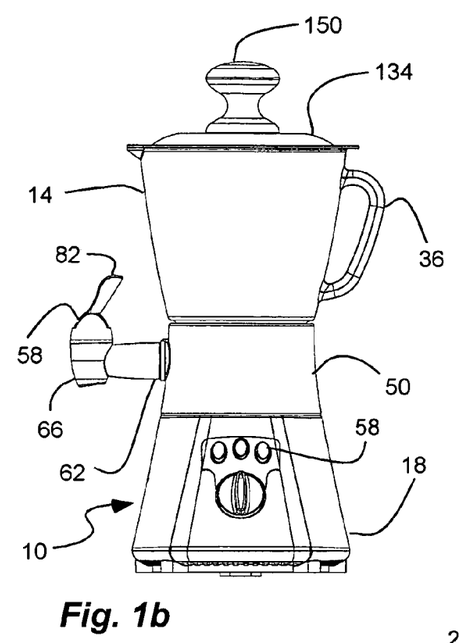

Referring to FIG. 1b, the first container base 50 can be disposed on the container 14 when it is desired to dispense contents from the bottom of the container, or through the faucet 58, without removing the container from the mixing base 18 or without pouring the contents through the spout or chute 46. For example, the faucet 58 can facilitate dispensing drinks or beverages, such as smoothies, etc. Thus, the faucet 58 is operatively coupled to the container 14 at or near the bottom of the container 14. The faucet 58 advantageously allows the contents of the container 14 to be dispensed through the faucet 58, as opposed to being poured through the top of the container. Such a configuration can be preferred for certain types of foods, such as liquids or beverages, such as smoothies and the like. In addition, the faucet 58 advantageously allows the contents to be dispensed while the mixing assembly is operating so that the contents can be simultaneously mixed and dispensed. In addition, the first container base 50 can be disposed on the container 14 when it is desired to used the first mixing assembly 38a or first blades 42a, such as for crushing ice.

Figures 5, 6, 7, 9:
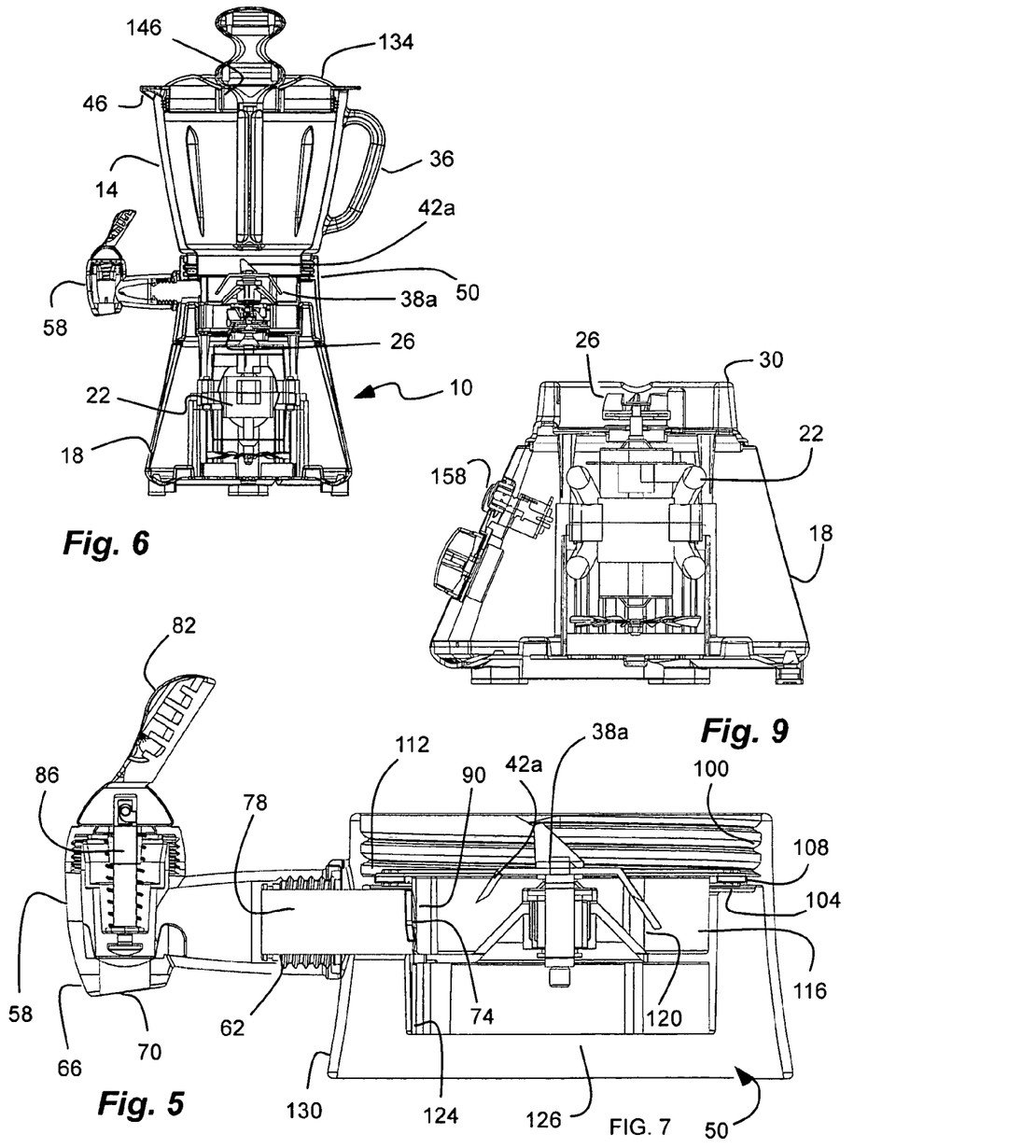
FIG. 5 is a cross-sectional side view of the first interchangeable container base of FIG. 3.
FIG. 6 is a cross-sectional front view of the food mixer or blender of FIG. 1b.
FIG. 7 is a perspective view of a base of the food mixer or blender of FIGS. 1a-c.
FIG. 9 is a cross-sectional side view of the base of FIG. 7.

Referring to FIGS. 3 and 5, the faucet 58 can have a proximal end 62 coupled to the container, and a distal end 66 with an outlet opening 70. The container base 50 can have an opening 74, with the proximal end 62 of the faucet 58 coupled to the container base portion at the opening. In addition, the container base 50 can include a threaded nipple 78 extending from the container base at the opening. Thus, the faucet 58 can be removably disposed on the container base 50, and can be removed for cleaning and the like, by threading the faucet onto the nipple. The faucet 58 can form a fluid channel through with the contents of the container flow to be dispensed. The faucet 58 can include any type of valve and/or actuation system. For example, the faucet 58 can include a handle 82 for displacing a plunger type valve 86 within the faucet. Thus, by lifting/depressing/turning the handle 82, the valve 86 is displaced allowing the contents of the container 14 to flow through the faucet 58. The valve 86 and/or actuator or handle 82 can be positioned at the distal end 66 of the spout. The faucet 58 extends outwardly and away from the container 14, to a position beyond a perimeter of the base so that the contents can be dispensed while the container remains on the base, and while the mixing element is turning. A ridge or flow diversion protrusion 90 can extend inwardly from an inner surface of the container base 50 adjacent to the outlet opening 70 and downstream with respect to the rotational direction of the mixing assembly 38 or blades 42 to guide contents through the outlet opening 70 and into the faucet 58.

In addition, a seal ring can be disposed between the faucet 58 and the nipple or container base. Furthermore, protrusions can be formed on either or both of the container base and faucet to properly position the faucet on the nipple as it is threaded onto the nipple.

Referring to FIG. 1*a*, the second container base 54 can be disposed on the container 14 when it is desired to pour contents from the chute 46, or when the contents will be too thick (or viscous) or large to flow through the faucet. Thus, the food mixer 10 can be used as both a beverage (smoothie) mixer and a food mixer, but without unnecessarily dirtying the faucet. So the food mixer 10 can be used as a food processor by removing the first container base, and replacing it with the second container base. Thus, when used as a food processor, or without the faucet, it is not necessary to clean the faucet. In addition, the second container base 54 can be disposed on the container 14 when it is desired to used the second mixing assembly 38*b* or second blades 42*b*, such as for chopping food.

As described above, two mixing assemblies 38*a* and *b*, each with different blades 42*a* and *b*, can be provided. Each mixing assembly 38*a* and *b* can be integrally formed with, or fixedly attached to, one of the container bases 50 and 54, so that each container base has its own mixing assembly. Alternatively, a single mixing assembly can be provided, and can be removably disposable in either container base.

Figure 4:
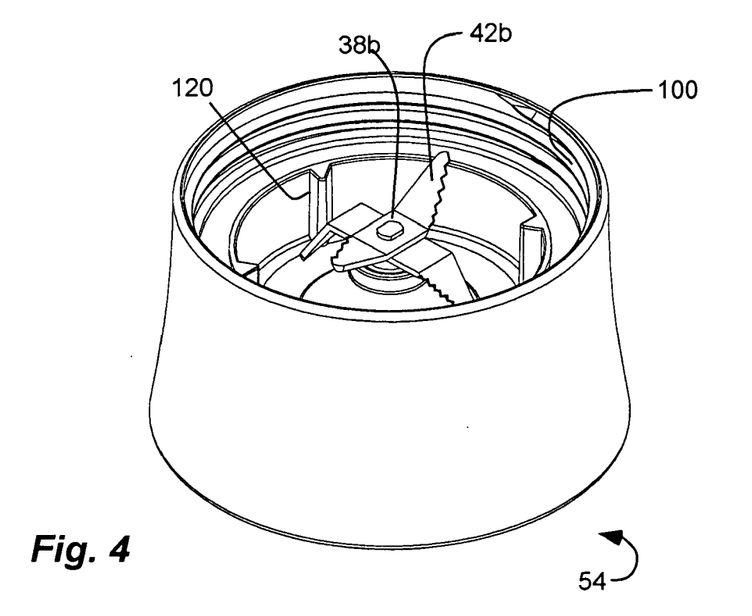

Referring to FIGS. 3-5, the container bases 50 and 54 can each include a receptacle 100 to receive a bottom of the container 14. The bottom of the container can include external screw threads that threadedly engage or mate with internal screw threads in the receptacle. Alternatively, the internal and external configuration of the screw threads can be reversed. Alternatively, mating tabs and slots can be utilized.

An annular flange 104 can be disposed in the bottom of the receptacle 100 to form a bottom of the receptacle and limit insertion of the bottom of the container. An annular channel 108 can be formed in the flange 104 to receive a seal ring 112, with the channel retaining the seal ring. A bottom of the container can compress or abut to the seal ring to seal the connection between the container and the container base. The seal ring 112 can be formed of a compressible material, and can have a flat body, with a rectangular cross-section, with a plurality of annular ridges or protrusions extending from the body. The ridges can be compressed as the container base is threaded onto the container to form a seal.

A recess 116 can be disposed within the container base, or within the receptacle 100. The mixing assembly 38 can be disposed in the recess 116. Referring to FIGS. 3 and 4, one or more projections 120 can extend inwardly into the recess 116 to restrict the circumference of the recess between the blades 42*a* or *b* and the wall to trap articles of food or ice and assist breaking or cutting of the articles. The projections can be vertically oriented, and can have sides or edges that are angled with respect to the wall of the recess, as shown, to direct contents towards the blades.

Referring to FIGS. 5 and 8, the container bases (represented by container base 50 in FIG. 5) can each include an inner shroud 124 to form another receptacle 126 to receive the wall 30 of the mixer base 18. Thus, the wall 30 can form a protrusion 128 (FIG. 8) that is received within the receptacle 126 formed by the inner shroud 124 to mount the container base on the mixing base. The protrusion 128 and receptacle 126, or wall 30 and shroud 124, can be shaped to mate in a particular orientation. For example, the vertical slots 33*a* and *b* or the receptacle 30 or perimeter wall 32 can mate with the vertical tabs 35*a* and *b* of the container bases 50 and 54. In another aspect, the receptacle can be shaped or configured to orient the container 14 or container bases 50 and 54 with respect to the base. For example, the receptacle or perimeter wall can be oblong or oval to restrict the orientation of the container (and faucet) on the base. Alternatively, the shape can be a non-equal triangle, etc. Thus, the container or container bases can be oriented on the base so that the faucet 58 has a particular position, such as to a lateral side of the mixing base 18. Positioning the faucet 58 on the side of the mixing base facilitates convenient operation of the device. For example, with the slots 33*a* and *b* and the tabs 35*a* and *b* positioned in the front and back, the faucet 58 can be selectively positioned on the left or right side of the mixing base as desired by the user. Thus, the user can position the faucet to suit the user's preference, such as being left or right handed. In addition, positioning the faucet 58 on the lateral side of the mixing base allows the shape of the mixing base to be more stable in the front and back directions. The mixing base 18 can have a larger depth, or dimension from front to back, to increase stability front to back, and a narrower width, or dimension from left to right, to accommodate the faucet, as shown in FIG. 8. Furthermore, positioning the faucet on the lateral side of the mixing base resists the faucet from interfering with buttons or controls on the mixing base. The slots and tabs are an example of one means for orienting the interchangeable container bases with respect to the mixing base so that the faucet is disposed on the lateral side of the mixing base. A shaped protrusion and receptacle, or wall and shroud, are an example of another means for orienting the interchangeable container bases with respect to the mixing base so that the faucet is disposed on the lateral side of the mixing base. The container bases 50 and 54 can also include outer shrouds 130 that match the outer surface of the mixer base 18 to prevent spills on the top of the mixer base, or between the mixer base and the container or container bases.

Referring again to FIGS. 1*a* and *b* and 2*a* and *b*, a lid 134 can be removably disposed on the container 14 to resist expulsion of the contents or the ingredients in the container during mixing, or while the blades 42*a* or *b* are rotating. The ingredients can be introduced into the container 14 by removing the lid 134 and inserting the ingredients into the container 14. As described above, the container can include the dispensing chute 46 in the top thereof so that the contents of the container can be disposed through the chute by tipping the container. In addition, the lid 134 can include a tab 138 (FIG. 2*b*) that can extend over the chute 46. The lid can be pivotal to selectively position the tab over the chute. The lid can be formed of a flexible and elastic material so that the lid can form a resistance fit or press fit with the top of the container. Furthermore, the lid 134 can include an aperture or opening 142 (FIG. 2*b*) through which ingredients can be introduced.

A cap or plug 146 can be selectively disposed in the opening 142 to resist contents from exiting the container during mixing. The cap or plug 146 can be formed of a hard or rigid plastic, and can form a resistance fit or press fit with the lid. Alternatively, the cap or plug can be twisted in the opening and tabs and slots can be formed between the cap or plug and the opening to selectively lock and unlock the cap by twisting. The cap or plug 146 can be disposed in the lid in the configuration without the faucet, as shown in FIGS. 1*a* and 2*a*.

In addition, a stir stick 150 can be carried by the lid 134 and can extend through the opening 142. The lid 134 can include a chamfer or bevel around the opening 142 to form a socket to receive a bulbous or ball portion 154 (FIG. 2*b*) of the stir stick to facilitate pivoting. For example, the bulbous or ball portion 154 can be a rounded lower portion that engages the socket to allow pivoting of the stir stick. The bulbous or ball portion 154 can include a hemisphere that is substantially spherical or round. In addition, the ball portion 154 can cover the opening 142 to resist contents from exiting the opening 142 while the stir stick is in use. The stir stick can be disposed on the lid in the configuration with the faucet, as shown in FIGS. 1*b* and 2*a*.

Controls or a control panel with buttons 158 for controlling the operation of the motor 18 also can be disposed on the mixer base 18, and can define a front of the mixer base. As is known in the art, the controls or buttons 158 can be electrically coupled to the motor to control its operation. The buttons 158 can include an on/off button, speed control, etc.

Figure 1C:
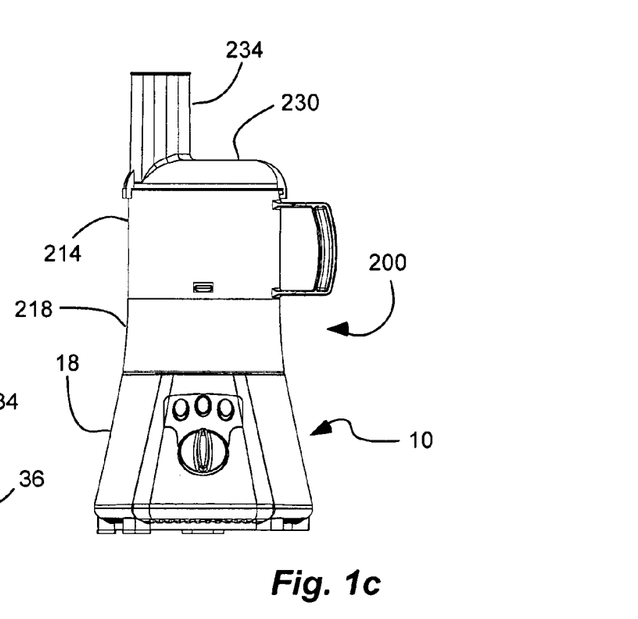
Figure 2B:
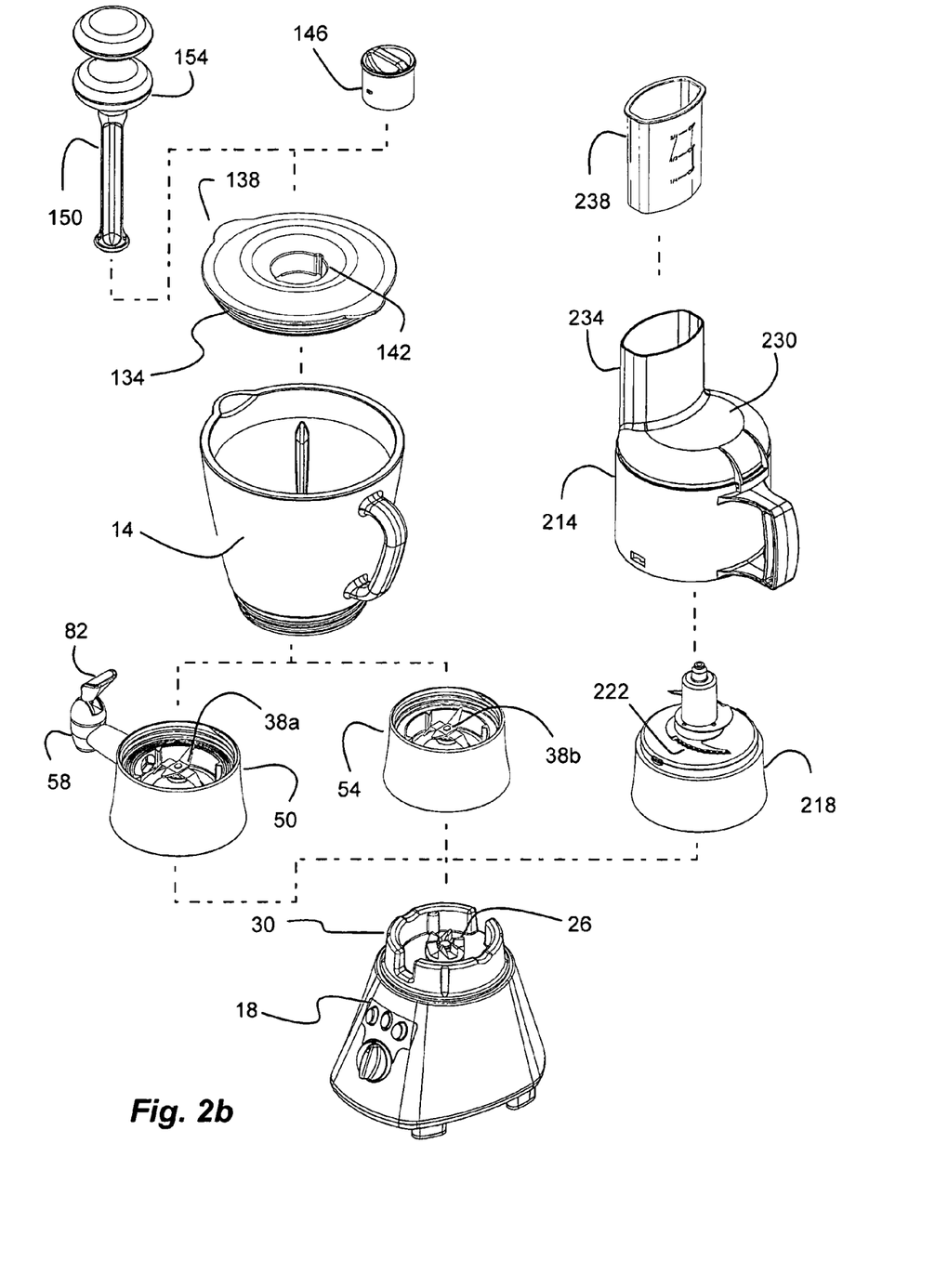
FIG. 2b is an exploded perspective view of the food mixer or blender of FIGS. 1a-c showing various possible configurations.

In addition, the food mixer 10 can include a food processing or chopping function or add-on. Referring to FIGS. 1*c* and 2*a* and *b*, the food mixer can include a chopper 200. The chopper 200 can include a different container 214 that is different from the container 14 for the blender or smoothie maker, and a third and different container base 218 that can couple to the base 18. The container 214 can be removably disposed on and coupled to the third container base 218. The chopper 200 can include one or more chopping blades 222 rotatably disposed in the container 214. The blades 222 can be disposed on a spindle and removably disposed on the container base 218. The third container base 218 can also include a gear system 226 coupled to the chopping blades 222 and engagable by the drive mechanism 26 of the base. Furthermore, the third container base 218 can have similar structure as the other container bases to allow it to couple to the mixing base. The container 214 can include a lid 230 and an elongated vertical chute 234. A tamping device 238 can be removably disposed in the chute 234.

In use, one of the interchangeable container bases 50 and 52 can be selectively coupled to the container 14. A user can decide whether to dispense the food or contents of the container through the faucet 58 on the container, or pour the food or contents from the chute 46 at the top of the container. If it is desired to pour the contents through the chute at the top, then the second container base 54, without a faucet, can be coupled to the container 14, as shown in FIG. 1*a*. If it is desired to dispense the contents through the faucet 58, then the first container base 50 can be coupled to the container 14, as shown in FIG. 1*b*. For example, the first container base 50 with the faucet 58 might be selected for use in making beverages, such as a smoothie, while the second container base 54, without a faucet, might be used in making other items, such as chopped ice, purees, etc. The container bases can be coupled to the container by screwing the container and one of the two interchangeable container bases together. For example, the bottom of the container can be disposed in the receptacle the container base. The bottom of the container can abut against the seal ring.

The container base 50 or 54 and container can be disposed on the mixing base 18. The mixing assembly can engage the motor carried by the mixing base. The first container base 50 can be oriented with respect to the mixing base 18 so that the faucet 58 is disposed on the lateral side with respect to the mixing base.

Ingredients can be introduced into the container 14 through the top. The lid 134 can be removed and ingredients introduced into the container. Alternatively, the cap 146 or stir stick 150 can be removed and the ingredients can be introduced through the aperture 142 in the lid. The cap 146 can be disposed in the lid 134 when the second container base 54, without the faucet, is used, while the stir stick 150 can be carried by the lid 134 when the first container base 50 is used. It is understood that the cap and stir stick can be used in either configuration, or with either container base.

The ingredients can be mixed in the container with the mixing assembly 38*a* or *b* or blades 42*a* or *b*. The buttons 158 on the mixing base 18 can be utilized to control the motor and the mixing. The stir stick 150 can be pivoted in the aperture 142 to facilitate mixing.

If the first container base 50 is used, the food or contents can be dispensed through the faucet 58. A cup or glass can be disposed on the lateral side of the mixing base and the valve or handle selectively operated to selectively open and close the faucet, and dispense contents through the faucet. The mixing assembly and motor can be operated during dispensing to facilitate dispensing of the contents. It will be appreciated that the turning of the mixing assembly or blades can direct contents out through the faucet. In addition, the contents can be diverted as they rotate in the container by a flow diversion protrusion extending inwardly from the wall of the container base proximate the outlet aperture. If the second container base 54 is used, the food or contents can be poured through the top of the container, or through the chute.

In addition, the user can decide to chop food. Thus, the third and different container base 218 can be removably disposed on the mixing base 18. Ingredients can be introduced into the different container 214, such as through the chute. The ingredients can be chopped in the different container 214 with at least one chopping blade 222, rotatably disposed in the different container.

Various aspects of beverage mixers are set forth in U.S. Pat. No. 6,527,433 and U.S. patent application Ser. No. 10/278,713, which are herein incorporated by reference.

The present invention also provides a faucet for use with a glass container or goblet. The container base 50 can form an adaptor to couple a faucet to the glass container. The container base 50 can be formed of plastic, such as by injection molding. Limitations in glass blowing or manufacturing created difficulties in providing a glass goblet or container with a faucet. The container base 50 of the present invention, however, advantageously allows the use of both a glass container and a faucet. A method for providing a glass goblet with a faucet includes forming a container from glass with a lower opening with external screw threads, such as by glass blowing or other glass manufacturing technique. A faucet or an inlet thereof with internal screw threads can be formed, such as by injection molding. A container base can be formed from plastic, such as by injection molding. The container base can include an upper opening with internal screw threads; a lateral protrusion with a lateral opening and external screw threads; and a lower opening. The external screw threads of the lower opening of the container can be screwed into the internal screw threads of the upper opening of the container base. The internal screw threads of the spout can be screwed over the external threads of the lateral protrusion of the container base.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A food mixer device, comprising:
   a) a container configured to receive food;
   b) a pair of interchangeable container bases, each separately and removably couplable to the container;
   c) at least one mixing assembly, rotatably disposed in the container; and
   d) a faucet, operatively coupled to one of the interchangeable container bases, including:
      a proximal end coupled to the container base;
      an opposite distal end with an outlet opening; and
      a valve operable to allow and restrict contents of the container through the faucet.

2. A device in accordance with claim 1, further comprising:
   a) a mixing base including a motor for turning a drive mechanism; and
   b) the at least one mixing assembly being engagable by the drive mechanism when the container is disposed on the mixing base.

3. A device in accordance with claim 2, further comprising:
   means for orienting the faucet on a lateral side of the mixing base when the interchangeable container base is disposed on the mixing base.

4. A device in accordance with claim 2, further comprising:
   a) a base receptacle, formed on a top of the mixing base, including a substantially annular wall;
   b) at least one vertical slot, extending into the substantially annular wall, and positioned at a front or rear of the base receptacle;
   c) a mating plug, formed on the mixing base, receivable into the base receptacle; and
   d) at least one mating vertical tab, extending from the mating plug and receivable in the vertical slot.

5. A device in accordance with claim 4, wherein the base receptacle includes a pair of vertical slots including a front slot and a rear slot, the rear slot extending to a bottom of the base receptacle and the front slot extending to a position above the bottom of the base receptacle.

6. A device in accordance with claim 1, wherein the at least one mixing assembly further includes a pair of mixing assemblies, each rotatably disposed in one of the interchangeable container bases.

7. A device in accordance with claim 1, wherein one of the container bases further includes:
   an outlet aperture near a bottom thereof between the container base and the faucet through which contents exit the container; and
   a flow diversion protrusion, extending inwardly from a wall of the container base proximate the outlet aperture to divert rotating contents through the outlet aperture and into the faucet.

8. A device in accordance with claim 1, wherein at least one of the interchangeable container bases further comprises:
   a) a receptacle for receiving the container therein;
   b) an annular flange, disposed in a bottom of the receptacle;
   c) an annular channel, formed in the annular flange;
   d) a seal ring, disposed in the annular channel.

9. A device in accordance with claim 8, wherein the at least one of the interchangeable container bases further comprises:
   a) a recess, disposed within the receptacle;
   b) the mixing assembly being disposed in the recess; and
   c) at least one projection extending into the recess.

10. A device in accordance with claim 1, further comprising a food processor including:
    a) a different container configured to receive food;
    b) a third and different container base, coupled to the different container;
    c) at least one chopping blade, rotatably disposed on the third and different container base;
    d) a gear system, coupled to the chopping blade, configured to be engagable by a drive mechanism when the different container base is disposed on a mixing base.

11. A device in accordance with claim 1, further comprising:
    a) a lid, disposable on the container, having an opening therein; and
    b) a stir stick, carried by the lid and extendable through the opening in the lid; and
    c) the stir stick having a bulbous portion with at least a lower hemisphere that is substantially rounded to pivot in the opening.

12. A food mixer device, comprising:
    a) a mixing base including a motor for turning a drive mechanism extending therefrom;
    b) a container configured to receive food;
    c) a pair of interchangeable container bases, each removably couplable to the container, and each removably disposable on the mixing base with the container coupled thereto, including:
       i) a first container base including a faucet to dispense contents from the container, the faucet including: a proximal end coupled to the container base, an opposite distal end with an outlet opening; and a valve operable to allow and restrict contents of the container through the faucet; and
       ii) a second container base without a faucet; and
    d) at least one mixing assembly, rotatably disposable in the container and engagable by the drive mechanism when the container is disposed on the mixing base.

13. A device in accordance with claim 12, wherein at least one of the interchangeable container bases further comprises:
    a) a receptacle for receiving the container therein;
    b) an annular flange, disposed in a bottom of the receptacle;
    c) an annular channel, formed in the annular flange;
    d) a seal ring, disposed in the annular channel.

14. A device in accordance with claim 13, wherein the at least one of the interchangeable container bases further comprises:
    a) a recess, disposed within the receptacle;
    b) the mixing assembly being disposed in the recess; and
    c) at least one projection extending into the recess.

15. A device in accordance with claim 12, further comprising:
   a) a base receptacle, formed on a top of the mixing base, including a substantially annular wall;
   b) at least one vertical slot, extending into the substantially annular wall, and positioned at a front or rear of the base receptacle;
   c) a mating plug, formed on the mixing base, receivable into the base receptacle; and
   d) at least one mating vertical tab, extending from the mating plug and receivable in the vertical slot.

16. A device in accordance with claim 15, wherein the base receptacle includes a pair of vertical slots including a front slot and a rear slot, the rear slot extending to a bottom of the base receptacle and the front slot extending to a position above the bottom of the base receptacle.

17. A device in accordance with claim 12, a food processor further comprising:
   a) a different container configured to receive food;
   b) a third and different container base, coupled to the different container, and disposable on the mixing base;
   c) at least one chopping blade, rotatably disposed in the different container;
   d) a gear system, coupled to the chopping blade, engagable by the drive mechanism when the different container base is disposed on the mixing base.

18. A food mixer device, comprising:
   a) a mixing base including a motor for turning a drive mechanism extending therefrom;
   b) a container removable disposable over the mixing base and configured to receive food;
   c) a pair of interchangeable container bases, each removably couplable to the container to close off a bottom of the container form a portion of the container, and each removably disposable on the mixing base with the container coupled thereto;
   d) at least one mixing assembly, rotatably disposable in the container and engagable by the drive mechanism when the container is disposed on the mixing base; and
   e) a faucet, operatively coupled to one of the interchangeable container bases, including: a proximal end coupled to the container base; an opposite distal end with an outlet opening; and a valve operable to allow and restrict contents of the container through the faucet.

19. A device in accordance with claim 18, further comprising:
   a) a base receptacle, formed on a top of the mixing base, including a substantially annular wall;
   b) at least one vertical slot, extending into the substantially annular wall, and positioned at a front or rear of the base receptacle;
   c) a mating plug, formed on the mixing base, receivable into the base receptacle; and
   d) at least one mating vertical tab, extending from the mating plug and receivable in the vertical slot.

20. A device in accordance with claim 19, wherein the base receptacle includes a pair of vertical slots including a front slot and a rear slot, the rear slot extending to a bottom of the base receptacle and the front slot extending to a position above the bottom of the base receptacle.

21. A device in accordance with claim 18, wherein at least one of the interchangeable container bases further comprises:
   a) a receptacle for receiving the container therein;
   b) an annular flange, disposed in a bottom of the receptacle;
   c) an annular channel, formed in the annular flange;
   d) a seal ring, disposed in the annular channel.

22. A device in accordance with claim 21, wherein the at least one of the interchangeable container bases further comprises:
   a) a recess, disposed within the receptacle;
   b) the mixing assembly being disposed in the recess; and
   c) at least one projection extending into the recess.

23. A device in accordance with claim 18, wherein one of the container bases further includes:
   an outlet aperture near a bottom thereof between the container base and the faucet through which contents exit the container; and
   a flow diversion protrusion, extending inwardly from a wall of the container base proximate the outlet aperture to divert rotating contents through the outlet aperture and into the faucet.

* * * * *